US012657734B2

(12) United States Patent
Leung

(10) Patent No.: US 12,657,734 B2
(45) Date of Patent: Jun. 16, 2026

(54) METHOD FOR DETECTING OBSTACLES, ELECTRONIC DEVICE, AND STORAGE MEDIUM

(71) Applicant: HON HAI PRECISION INDUSTRY CO., LTD., New Taipei (TW)

(72) Inventor: Yin-Chung Leung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 405 days.

(21) Appl. No.: 18/224,629

(22) Filed: Jul. 21, 2023

(65) Prior Publication Data

US 2024/0257357 A1     Aug. 1, 2024

(30) Foreign Application Priority Data

Feb. 1, 2023     (CN) .......................... 202310078138.2

(51) Int. Cl.
*G06T 7/20*          (2017.01)
*G06T 7/30*          (2017.01)
*G06T 7/73*          (2017.01)

(52) U.S. Cl.
CPC .................. *G06T 7/20* (2013.01); *G06T 7/30* (2017.01); *G06T 7/73* (2017.01); *G06T 2207/30261* (2013.01)

(58) Field of Classification Search
CPC .... G06T 7/20; G06T 7/30; G06T 7/73; G06T 2207/30261; G06T 2207/10028; G06T 7/246; G01S 13/931; G01S 13/723
See application file for complete search history.

(56) References Cited

U.S. PATENT DOCUMENTS

| | | | | |
|---|---|---|---|---|
| 10,657,811 | B2 * | 5/2020 | McNew ................ | B60W 40/00 |
| 2023/0067751 | A1 * | 3/2023 | Yousef ................. | G01S 7/4808 |
| 2024/0111297 | A1 * | 4/2024 | Masuda ................ | G05D 1/622 |

FOREIGN PATENT DOCUMENTS

| | | | |
|---|---|---|---|
| CN | 115649178 | 1/2023 | |
| CN | 115649199 | 1/2023 | |
| TW | 202113696 | 4/2021 | |
| WO | WO-2022034815 A1 * | 2/2022 | ........... G08G 1/0112 |

* cited by examiner

*Primary Examiner* — Shefali D Goradia
(74) *Attorney, Agent, or Firm* — ScienBiziP, P.C.

(57)          ABSTRACT
A method for detecting obstacles implemented in an electronic device includes obtaining detection point data from at least one sensor, the detection point data comprising a first position coordinate of each of a plurality of detection points; transforming the first position coordinate of each of the plurality of detection points to a second position coordinate of each of the plurality of detection points relative to an ego vehicle; determining at least one target object according to a plurality of second position coordinates; calculating target object data of the at least one target object according to a second position coordinate of each of the plurality of detection points relative to the ego vehicle; tracking the at least one target object according to the target object data.

20 Claims, 9 Drawing Sheets

Detection point group 301

Detection point group 302

Sensor

The arrow indicates the scanning direction

Bounding box 303

Bounding box 304

Bounding box 305

Sensor

The arrow indicates the scanning direction

METHOD FOR DETECTING OBSTACLES, ELECTRONIC DEVICE, AND STORAGE MEDIUM

FIELD

The subject matter herein generally relates to a technology of safe driving, and particularly to a method for detecting obstacles, an electronic device, and a storage medium.

BACKGROUND

To determine the motion of surrounding objects of a moving vehicle, the detection data from the sensors of the moving vehicle is collected, followed by processing the detection data with object tracking technologies. However, it is common to encounter the following problems in handling obstacles tracking:

computing cost problem: when a lot of detection points of an object are measured, the estimation of the position and velocity of the object cannot estimated by a simple average method. If an optimization method or a neural network is used for object detection and estimation, it will bring high computational cost;

equipment cost problem: the radar sensing solution is not accurate enough, and a number of sensors such as cameras and radars are often required for object tracking;

computing accuracy problem: due to physical limitations, only one side or one corner of the object can be detected, if only the point cloud is used as the measurement point of the object, it is difficult to evaluate the actual center position of the object.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
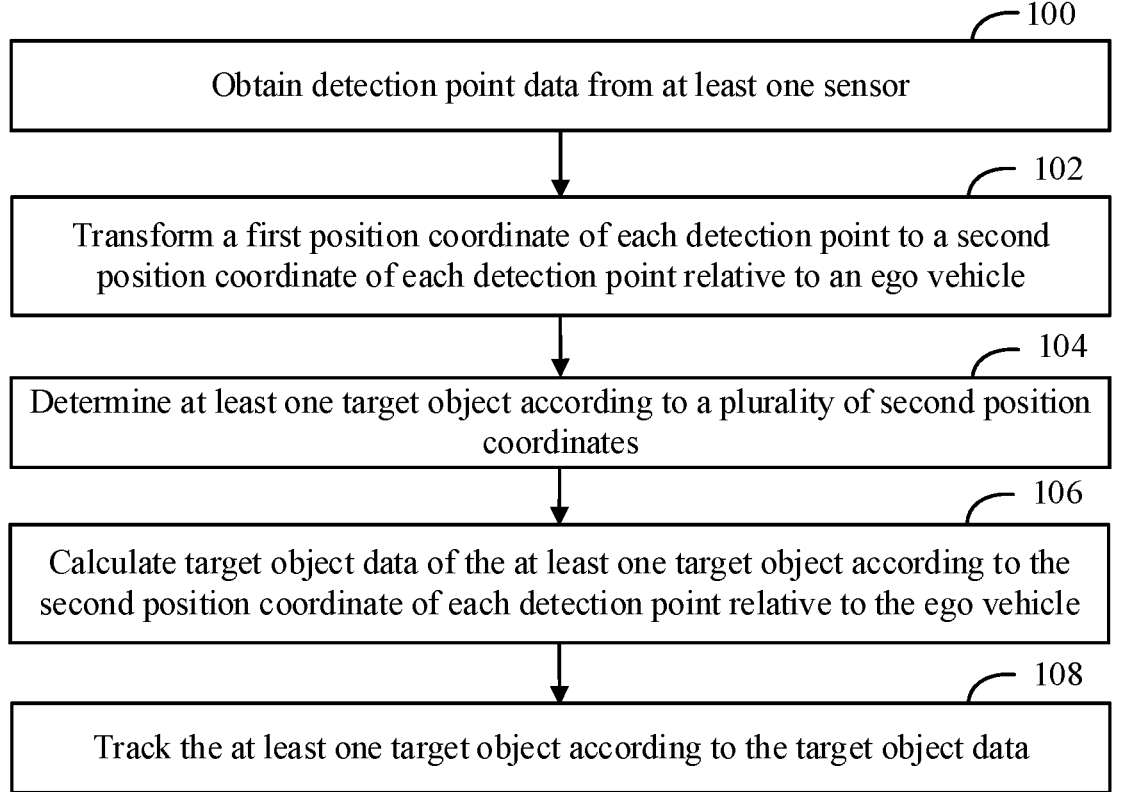
FIG. 1 illustrates a flowchart of an embodiment of a method for detecting obstacles according to the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

In view of the problems of high computing cost, high equipment cost, and low computing accuracy in obstacle detection, the embodiment of the present disclosure provides a method for detecting obstacles, which can greatly reduce the detection cost and improve the detection accuracy.

The method for detecting obstacles is applied to an electronic device (such as the vehicle-mounted device 10 shown in FIG. 9), the electronic device may be a vehicle-mounted device in a vehicle, or it may be an independent device that can communicate with the vehicle-mounted device in the vehicle, and perform interaction with the vehicle-mounted device. The electronic device can be a device that automatically performs numerical calculation and/or information processing according to preset or stored instructions, and the hardware of the electronic device includes, but is not limited to, microprocessors, application-specific integrated circuits (ASICs), on-site programmable Programmable Gate Arrays (FPGAs), Digital Signal Processors (DSPs), Embedded Devices, etc. The electronic device may also include network devices and/or user devices. The networks device include, but are not limited to, a single network server, a server group including multiple network servers, or a cloud including a large number of hosts or network servers based on cloud computing. The user devices include, but are not limited to, any electronic product that can interact with the user through keyboards, mice, remote controls, touch pads, or voice-activated devices, such as personal computers, tablet computers, smart phones, personal digital Assistant (PDA) etc.

FIG. 1 illustrates a flowchart of an embodiment of a method for detecting obstacles. The method is provided by way of example, as there are a variety of ways to implement the method. Each block shown in FIG. 1 represents one or more processes, methods, or subroutines implement in the example method. Furthermore, the illustrated order of blocks is by example only and the order of the blocks can be changed. Additional blocks may be added or fewer blocks may be utilized, without departing from this disclosure. The example method can begin at block 100.

At block 100, an electronic device obtains detection point data from at least one sensor, the detection point data includes a first position coordinate of each detection point in a plurality of detection points.

Figure 2:
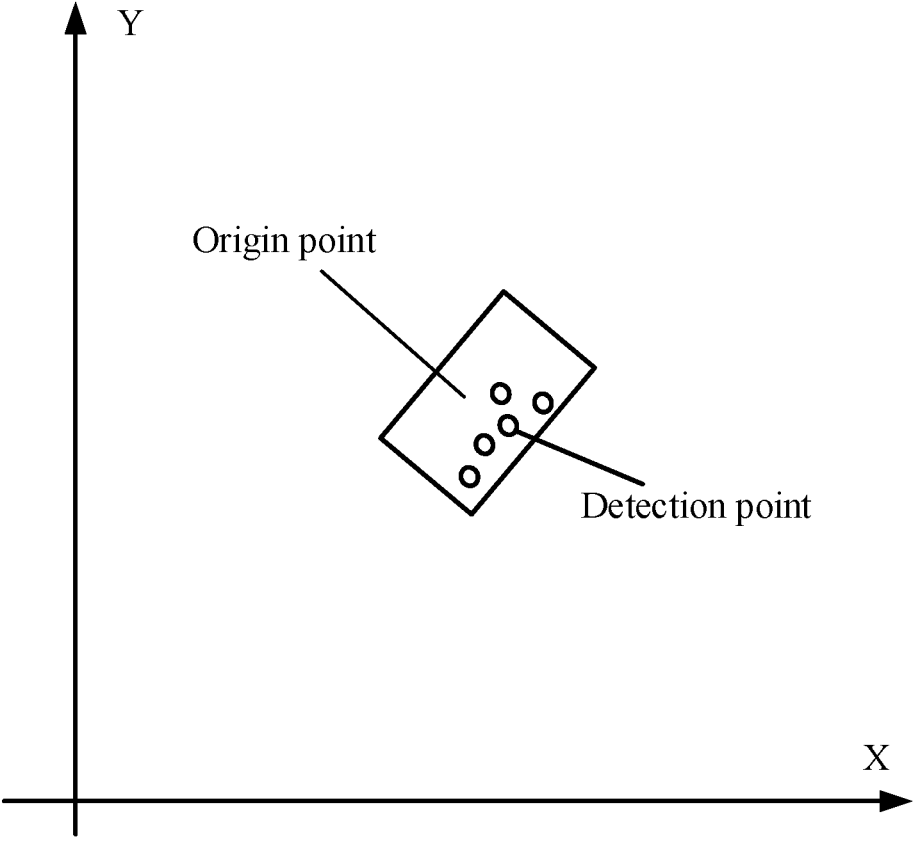
FIG. 2 is a schematic view of an embodiment of alignment of a bounding box of a target object according to the present disclosure.

In one embodiment, the electronic device utilizes the at least one sensor as a data source of detection points, and the at least one sensor includes, but is not limited to, radar, Doppler lidar, ultrasonic wave sensors, and the like. The at least one sensor can detect the plurality of detection points, and the detection point data includes a detection timestamp, and a relative velocity of each detection point relative to the at least one sensor. In one embodiment, as shown in FIG. 2, the first position coordinate of each detection point may include the coordinate of each detection point in the coordinate system of the at least one sensor. In one embodiment, the at least one sensor may be a Doppler sensor.

At block 102, the electronic device transforms the first position coordinate of each detection point to a second position coordinate of each detection point relative to the ego vehicle.

In order to clearly illustrate the embodiments of the present disclosure, the vehicle utilizes the electronic device to detect obstacles in the surrounding environment is described as "ego vehicle", so as to distinguish it from other vehicles.

In one embodiment, the electronic device utilizes a coordinate transformation method to transform the first position coordinate of each detection point in the sensor coordinate system (hereinafter referred to as the first coordinate system) to a coordinate system (hereinafter referred to as the second coordinate system) relative to the ego vehicle, the second coordinate system is based on the coordinates of an origin point (i.e., center point) within the ego vehicle, and the coordinate transformation methods include rotation, translation, stretching, and shearing, etc.

At block 104, the electronic device determines at least one target object according to the plurality of second position coordinates.

In a first embodiment, the electronic device determines at least one target object according to the plurality of second position coordinates by: based on the second position coordinate of each detection point relative to the ego vehicle, obtaining at least one detection point group by grouping the plurality of detection points by a clustering algorithm; based on the at least one detection point group, determining a bounding box of a target object according to a preset target object model; aligning the bounding box of the target object to the position of each detection point group, and obtaining an aligned bounding box corresponding to each detection point group; processing the aligned bounding box corresponding to each detection point group, and obtaining at least one processed aligned bounding box.

The electronic device processes the aligned bounding box corresponding to each detection point group, and obtains at least one processed bounding box by: if at least two aligned bounding boxes overlap, and the at least two aligned bounding boxes meet a preset overlapping condition, combining the at least two aligned bounding boxes; determining the combined bounding box as a single target object.

Based on the at least one detection point group, the electronic device determines the bounding box of the target object according to a preset target object model by: when it is determined whether the size of the detection point group is the same as or similar to the size of the vehicle, determining a vehicle model to be the bounding box of the detection point group if the size of the detection point group is the same as or similar to the size of the vehicle, and obtaining the size of the bounding box of the target object by reducing the size (e.g., 4.8 meters long and 1.8 meters wide) of a general vehicle according to a preset ratio (e.g., 10:1).

In one embodiment, the preset overlapping condition includes, but is not limited to, an overlapping ratio between at least two bounding boxes being high, directions of the at least two bounding boxes being similar. In detail, if the ratio of the overlapping area of the two bounding boxes is greater than a preset overlap threshold, it indicates that the overlapping ratio of the two bounding boxes is high, and the two bounding boxes are required to be combined. The preset overlap threshold may be 30%. If the distance between two bounding boxes is short, that is, the distance between the two bounding boxes is less than a preset distance threshold, and the directions of the two bounding boxes are similar, that is, the similarity of the directions is greater than or equal to the preset similarity threshold, for example, the distance between two bounding boxes is less than half the size of any bounding box, and the directions are similar (e.g., when the bounding boxes are rectangles, the rectangular sides of the two bounding boxes are in parallel or nearly in parallel), then the two bounding boxes are required to be combined.

In a second embodiment, the electronic device determines at least one target object according to the plurality of second position coordinates by: based on the second position coordinate of each detection point relative to the ego vehicle, obtaining at least one detection point group by grouping the plurality of detection points by the clustering algorithm; determining a target object model corresponding to each detection point group; determining a bounding box of the target object according to each target object model; aligning the bounding box of the target object to the position of each detection point group, and obtaining a bounding box corresponding to each detection point group; processing the bounding box corresponding to each detection point group, and obtaining at least one processed bounding box.

The electronic device may preset bounding boxes of a plurality of target objects of different sizes and different categories, that is, each bounding box corresponds to a target object of a size and a category. For example, when the target object is a vehicle, the electronic device may preset the size of the bounding box of the target object according to the size of a general vehicle; when the target object is a human, the size of the bounding box of the target object may be preset according to the size of a human. In one embodiment, the electronic device determines the category of the target object, and selects the bounding box of the target object according to the category of the target object.

In one embodiment, the electronic device determines the category of the target object according to the size of the detection point group. For example, after the size of the detection point group is enlarged according to the specified ratio, if the size of the detection point group matches the size of the general vehicle, the category of the target object is determined to be the vehicle. If the size of the detection point group is enlarged according to the specified ratio, if the size of the detection point group matches the size of the human, the category of the target object is determined to be the human. If the size of the detection point group is the same as the size of a tree, the category of the target object is determined to be the tree.

Based on the above method, the electronic device can determine one or more target objects according to the detection point data, and each target object is the object around the ego vehicle, including but not limited to vehicles, pedestrians, and obstacles.

In one embodiment, the electronic device performs data analysis on all detection points after the sensor completes sensing each time, and transforms the position coordinate of each detection point on the coordinate system of the sensor to coordinates relative to the center point of the ego vehicle. The electronic device regards centralized distributed detection points as the same target object by the clustering algorithm, and obtains the bounding box of the target object corresponding to the category of the target object detected by the sensor at the latest timestamp.

The clustering algorithm includes, but not limited to, DBSCAN, grid clustering, and the like. In one embodiment, the clustering algorithm can be DBSCAN (Density-Based Spatial Clustering of Applications with Noise) algorithm, DBSCAN is a density-based spatial clustering algorithm. The DBSCAN algorithm is based on density clustering, by inspecting the relationship between detection points, scanning the entire data set, determining any core point, and expanding the core point, it can be quickly clustered and can effectively deal with noise points, and determine spatial clusters of arbitrary shape.

The electronic device determines the coordinates of the center point of each bounding box as the position coordinates of the target object corresponding to each bounding box. In the coordinate system (hereinafter ego vehicle coordinate system) of the ego vehicle, the sensor can detect a plurality of detection points, the electronic device can obtain the coordinates of the plurality of detection points, and align the bounding box in the coordinate space according to the size of the bounding box, so that the bounding box can cover the edge position of the detection points.

Figure 3:
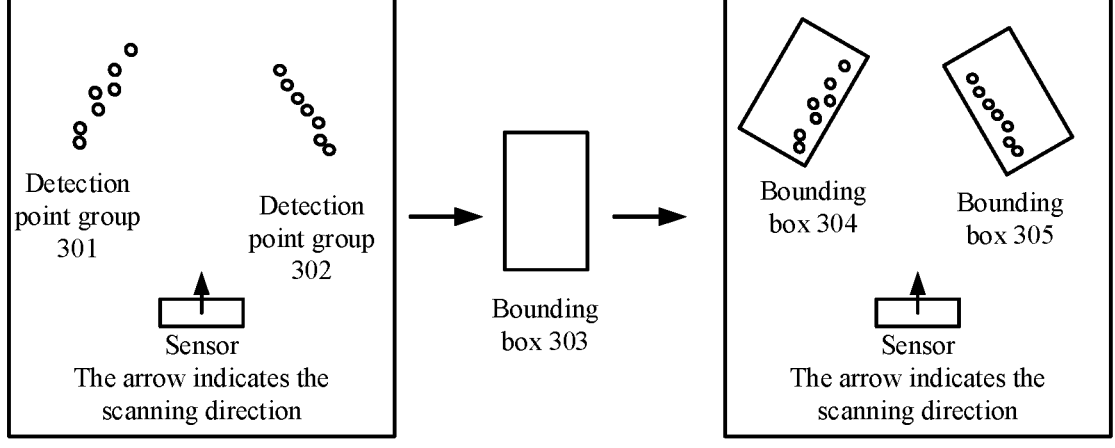
FIG. 3 is a schematic view of an embodiment of determining the alignment direction of the bounding box of the target object according to the present disclosure.

Referring to FIG. 3, the electronic device obtains a detection point group 301 and a detection point group 302 by the clustering algorithm, and set the general vehicle as the target object bounding box 303 by the preset target object model; aligns the target object bounding box 303 on the detection point group 301 and the detection point group 302 respectively, and obtains bounding boxes 304 and 305. In one embodiment, when the electronic device aligns the target object bounding box 303 on the detection point group 301 and the detection point group 302 respectively, so that the bounding boxes 304 and 305 are aligned in a way that the detection point groups 301 and 302 are in the bounding box side which is nearer to the scanning direction of the sensor. As illustrated in FIG. 3, the bounding box 304 makes the detection point group 301 be located on the right side of the bounding box of the target object. When aligning the bounding box of the target object on the detection point group 302, the bounding box 305 of the detection point group 302 is aligned in the position that the detection point group 302 is within the bounding box and closes to the scanning direction of the sensor. As illustrated in FIG. 3, the bounding box 305 makes the detection point group 302 be located on the left side of the bounding box of the target object.

Figure 4A:
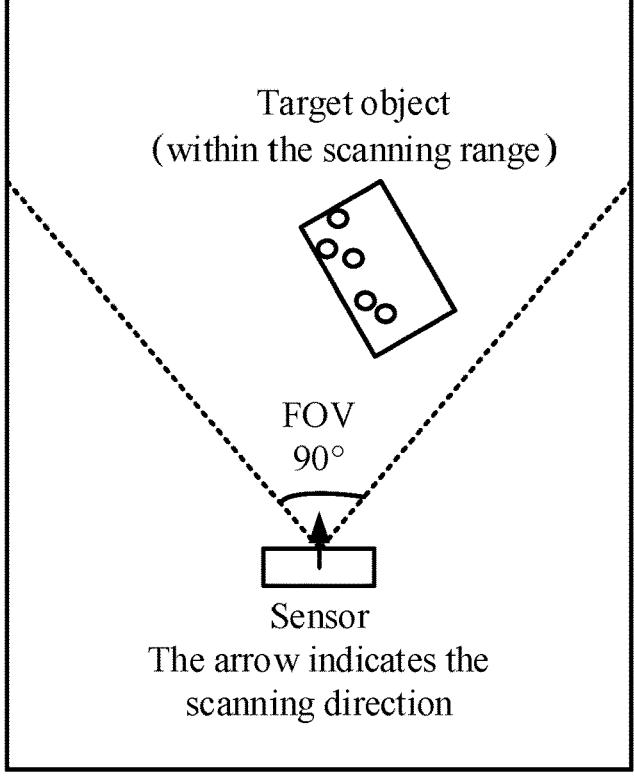
FIGS. 4A and 4B are schematic views of an embodiment of bounding box alignment of the target object according to the present disclosure.

Due to different positions and angles of the detection point groups relative to the sensor, the alignment condition for aligning the bounding box of the target object to the corresponding detection point group is that the detection point group faces the scanning direction of the sensor, thus, the alignment positions of the bounding boxes of the target objects are different. Each sensor has a sensing range, the sensing range is Field of View (FOV). Take the sensor arranged in front of the vehicle as an example, according to the top view shown in FIG. 4, the arrow in FIG. 4 indicates the scanning direction of the sensor, it is assumed that the sensing range of the sensor is within the angle of 90 degrees formed by the dotted line in FIG. 4, when the target object is completely within the sensing range of the sensor, the alignment position of the bounding box of the target object makes the corresponding detection point group face the scanning direction of the sensor and makes the bounding box completely fall into the sensing range of the sensor. The sensing range of the sensor is the front range of the sensor, when the target object is within the sensing range, the alignment position of the bounding box of the target object makes the corresponding detection point group face the direction of the sensor and makes the bounding box completely fall into the sensing range of the sensor. For example, the bounding box of the target object is aligned on the detection point group as shown in FIG. 4A, so that the detection point group is in the lower left direction of the bounding box of the target object.

Figure 4B:
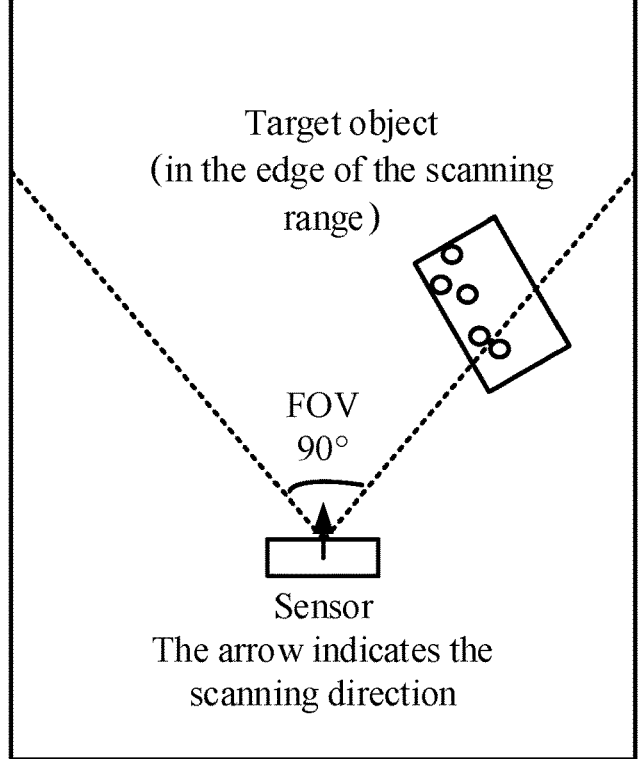

When the target object falls into the edge of the sensing range of the sensor, the alignment position of the bounding box of the target object faces the direction of the sensor, and the detection point group is located in the bounding box of the target object, and within the sensing range of the sensor. As shown in FIG. 4B, the detection point group is at the edge of the sensing range of the sensor, and the bounding box of the target object is aligned on the detection point group, so that the detection point group is in the bounding box of the target object and faces the direction of the sensor, for example, as shown in FIG. 4B, the bounding box of the target object is aligned on the detection point group, so that the detection point group is in the upper left direction of the bounding box of the target object.

In one embodiment, when aligning the detection point group, the detection point group closes to the edge of the sensor, and is aligned at the position closest to the sensor, and the alignment direction where the detection point group is located is the direction facing the sensor.

At block 106, the electronic device calculates target object data of the at least one target object according to the second position coordinate of each detection point relative to the ego vehicle.

In one embodiment, the electronic device calculates the position coordinates and velocity of the at least one target object relative to the ego vehicle according to the second position coordinate of each detection point relative to the ego vehicle, and an included angle between the direction of the velocity of the at least one target object and the X-axis of the coordinate system of the ego vehicle; determines the position coordinates and velocity of the at least one target object relative to the ego vehicle, and the included angle between the direction of the velocity of the at least one target object and the X-axis of the coordinate system of the ego vehicle as the target object data.

Figure 5:
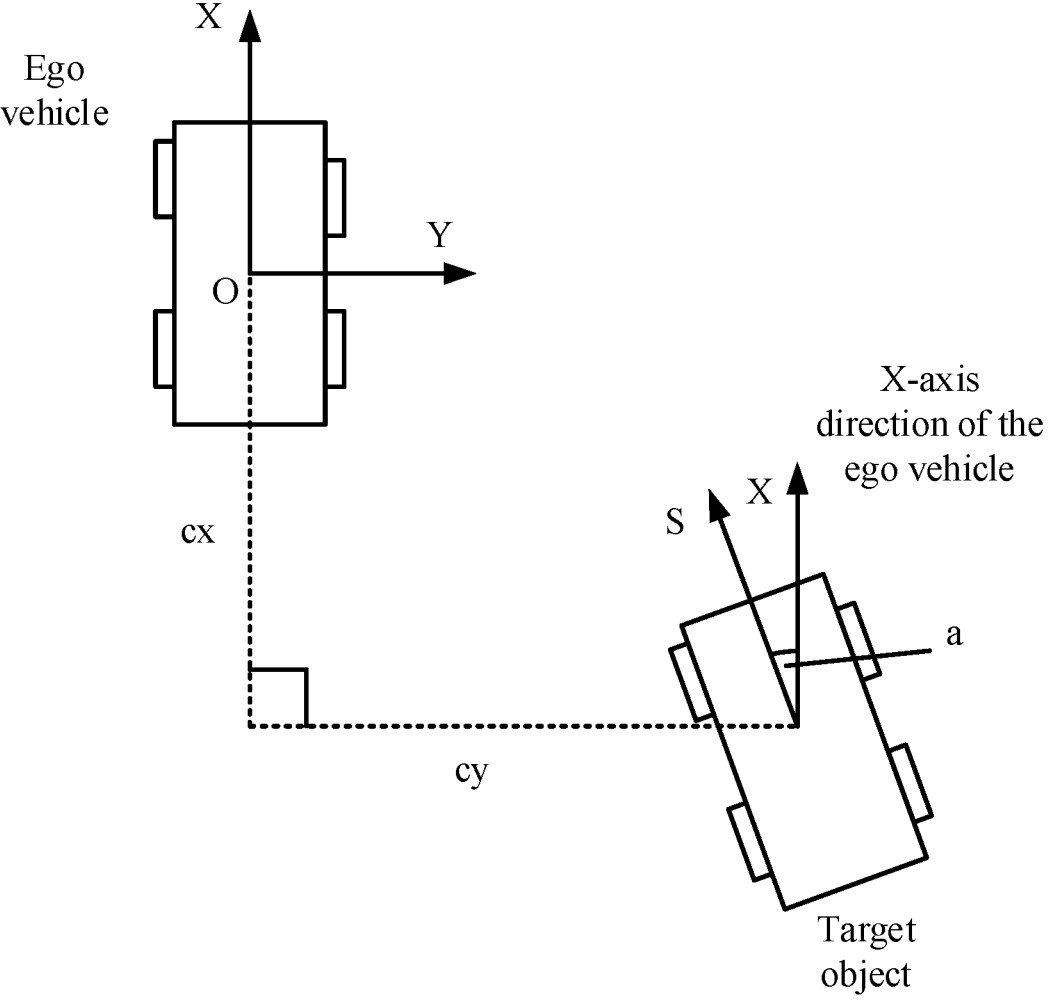
FIG. 5 is a schematic view of an embodiment of coordinates of the target object relative to a vehicle coordinate system according to the present disclosure.

FIG. 5 is a schematic view of the coordinates of the target object relative to the coordinate system of the ego vehicle. A positive direction of the X-axis is used to represent the front of the ego vehicle, a negative direction of the X-axis is used to represent the rear of the ego vehicle, a positive direction of the Y-axis is used to represent the right of the ego vehicle, and a negative direction of the Y axis is used to represent the rear of the ego vehicle, O is the origin point of the ego vehicle, the dotted line cx is the x coordinate of the target object, the dotted line cy is the y coordinate of the target object, and S is the relative velocity of the target object relative to the ego vehicle, the included angle α is the included angle between the relative velocity of the target object and the positive direction of the X-axis.

It should be noted that, when any target object corresponds to two or more detection points, the electronic device can calculate the velocity and direction of the target object. In detail, the electronic device randomly selects two different detection points of the detection point group, calculates the relative velocity and relative direction of the target object by using the measured radial velocity of each selected detection point, and the included angle between a line connecting each detection point and the sensor and the x-axis. The measured radial velocity of each detection point is detected by the sensor. The electronic device selects two different detection points multiple times, calculates a plurality of relative velocities and a plurality of relative directions of the target object, removes outliers from the plurality of relative velocities and plurality of relative directions, and then calculates an average value of the relative velocity according to the remaining relative velocities, determines the average value of the relative velocity as the relative velocity of the target object, calculates an average value of the relative direction according to the remaining relative directions, and determines the average value of the relative direction as the relative direction of the target object.

Figure 6A:
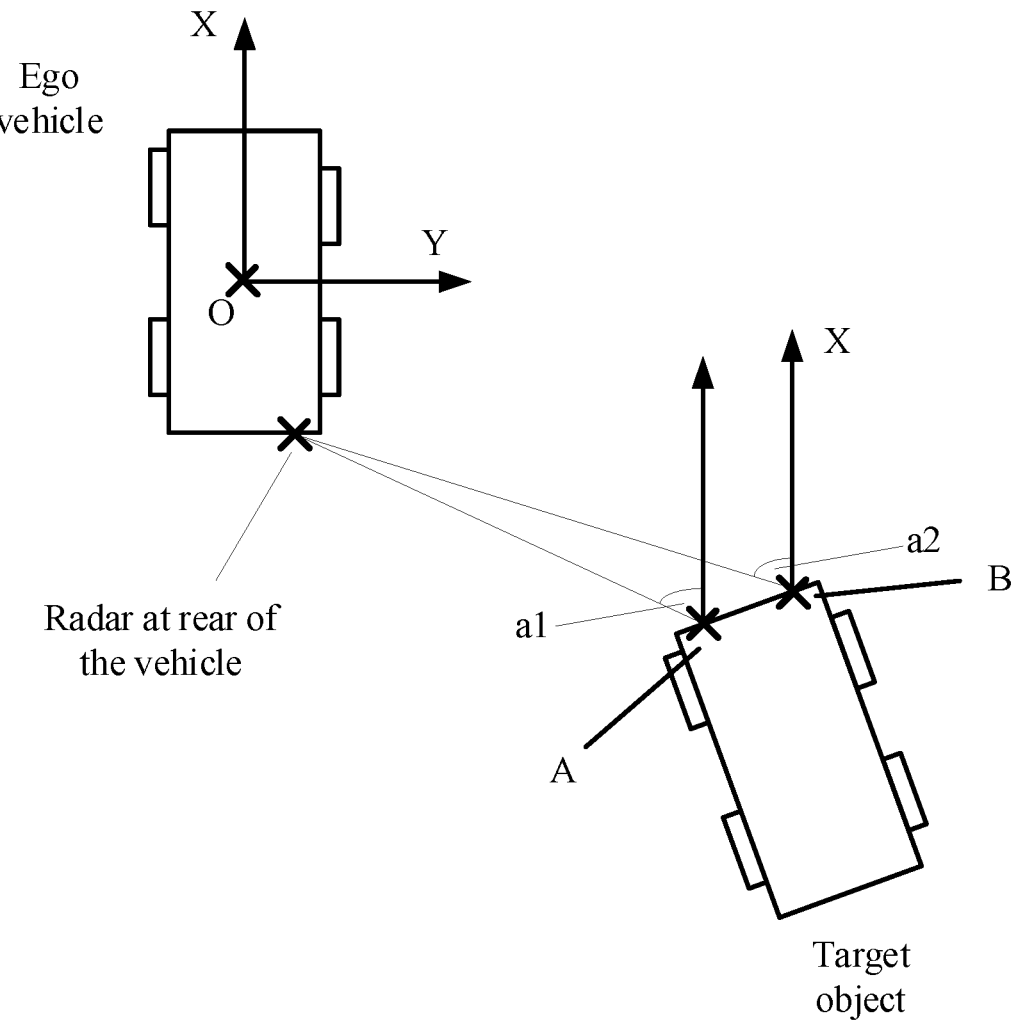
FIGS. 6A and 6B are schematic views of an embodiment of an estimation method of plane relative velocity and direction according to the present disclosure.
Figure 6B:
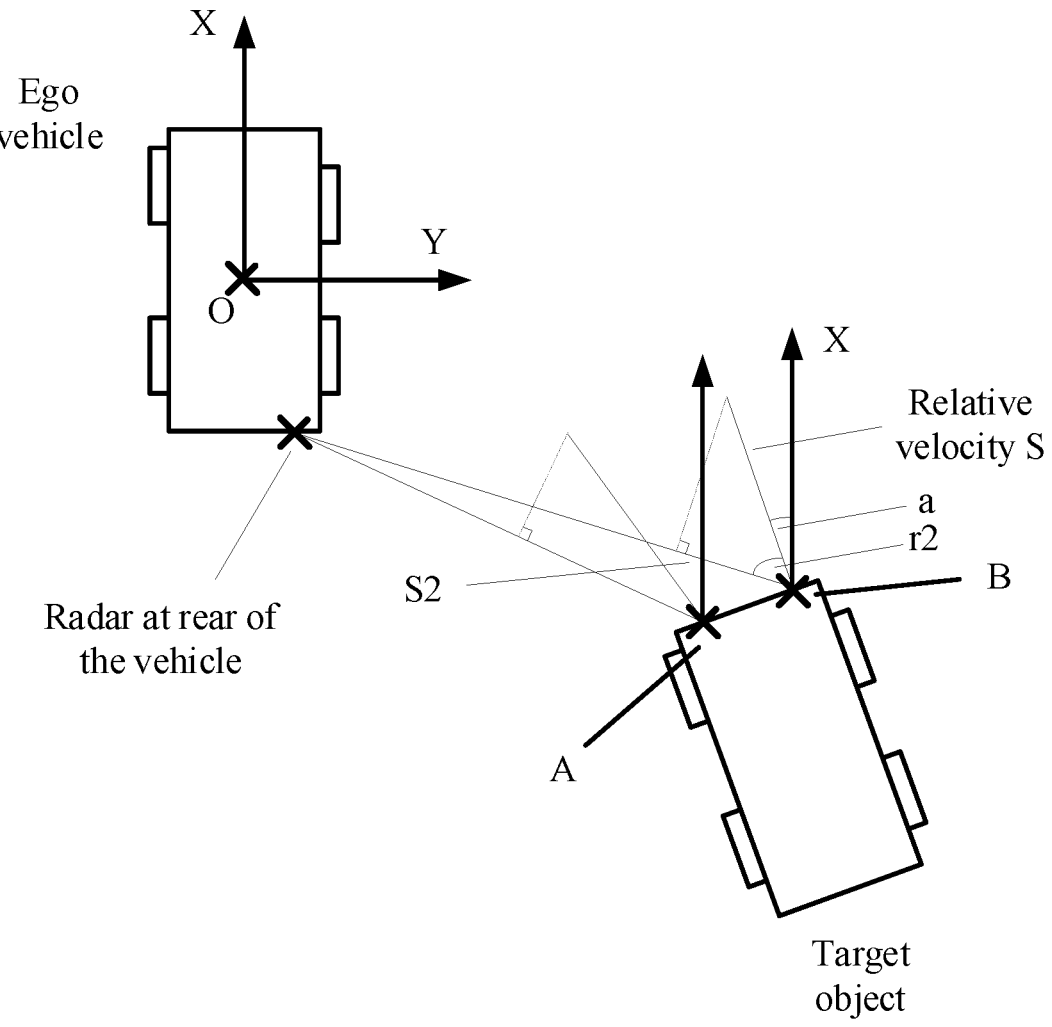

FIGS. 6A and 6B is a schematic view of the velocity and the direction of the target object, for example, the sensor can be a radar, the radar is arranged at the rear of the vehicle, and the sensor detects two detection points A and B (i.e., detection points A and B shown in FIGS. 6A and 6B) on the target object behind the vehicle, the included angle between the line connecting the detection point A and the sensor and the positive direction of the X-axis is $\alpha 1$, the included angle between the line connecting the detection point B and the sensor and the positive direction of the X-axis is $\alpha 2$, the measured radial velocity of the detection point A is S1, and the measured radial velocity of the detection point B is S2 (S2 is shown in FIG. 6B, S1 is not shown), the relative velocity S of the target object relative to the ego vehicle, and the included angle α between the relative velocity S and the coordinate system of the ego vehicle can be calculated according to the following formula (1):

$$\begin{cases} S \cdot \cos(r1) = S1 \\ S \cdot \cos(r2) = S2 \\ a1 - r1 = a \\ a2 - r2 = a \end{cases} \qquad (1)$$

In the formula (1), r1 is the included angle between the relative velocity S of the target object relative to the ego vehicle and the line connecting the detection point A and the radar, and r2 is the included angle between the relative velocity S of the target object relative to the ego vehicle and the line connecting the detection point B and the radar.

The electronic device selects N pairs of detection points, calculates N relative velocities of the target object relative to the ego vehicle, such as v1, v2, . . . , vn, calculates the average value v of the N relative velocities, and determines the average value v of the N relative velocities as the relative velocity of the origin point of the target object relative to the ego vehicle. Similarly, the electronic device selects N pairs of detection points, and calculates N included angles between the relative velocity v of the target object relative to the ego vehicle and the coordinate system of the ego vehicle, such as b1, b2, . . . , bn, calculates the average value b of the N included angles, and determines the average value b of the N included angles as the relative movement direction of the origin point of the target object.

In another embodiment, in the plane coordinate system, calculating the actual velocity and direction of each target object requires at least two detection points. In the three-dimensional coordinate system, at least three detection points are required for calculating the three-dimensional velocity and direction of each target object. Take the plane coordinate system (e.g., the coordinate system of the ego vehicle) as an example, the electronic device select N pairs of detection points, each pair of detection points includes two detection points, and these two detection points are randomly selected, for each pair of detection points, the electronic device calculates the actual velocity of the target object and the angle of the actual movement direction of the target object, according to the coordinates of the two detection points and the relative velocities of the two detection points relative to the ego vehicle. The electronic device repeatedly calculates the actual velocity value and the actual angle of movement direction of the N pairs of detection points, and after the outliers are removed, the electronic device determines the actual velocity of the target object and the actual angle of movement direction relative to the X-axis of the ego vehicle by calculating the average value. The method for obtaining the actual velocity and direction of the target object is the similar to the method for obtaining the relative velocity and direction of the target object.

Figure 7A:
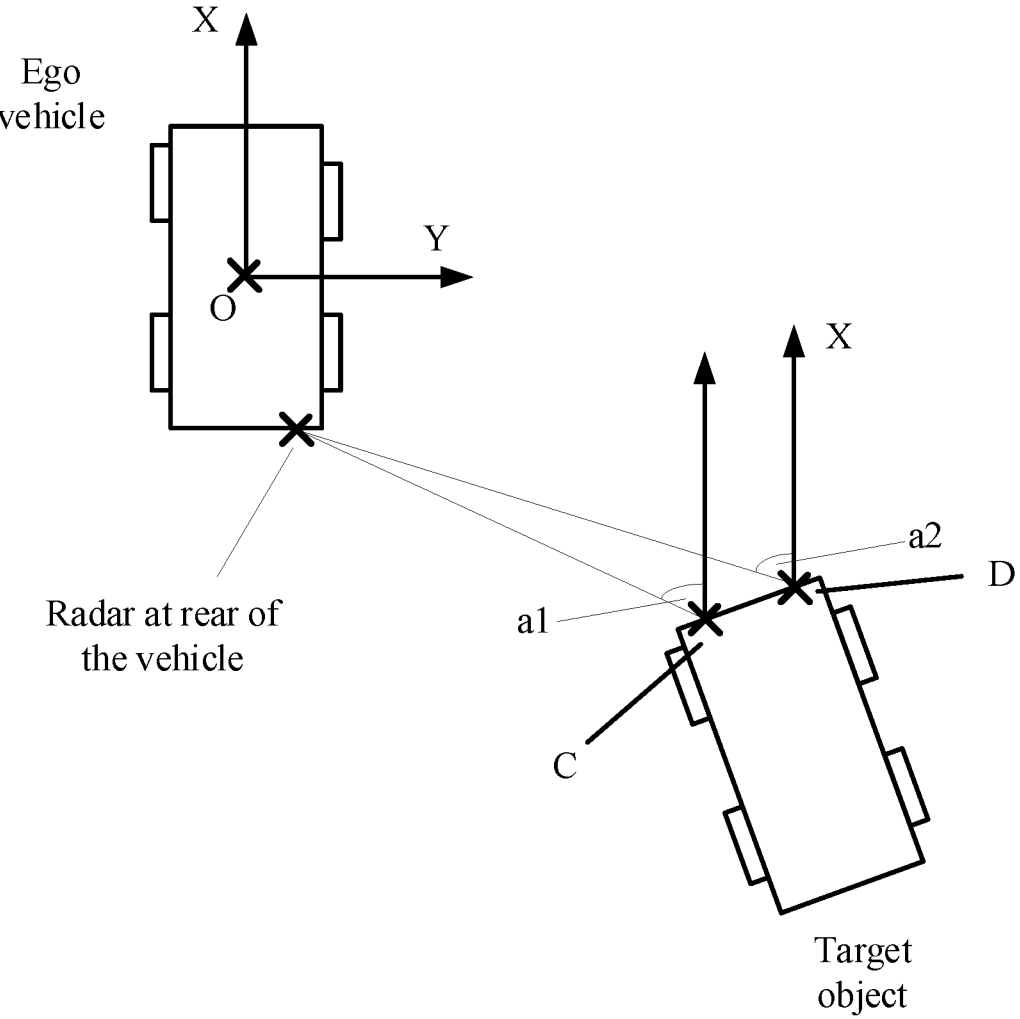
FIGS. 7A and 7B are schematic views of an embodiment of an estimation method of plane actual velocity and direction according to the present disclosure.
Figure 7B:
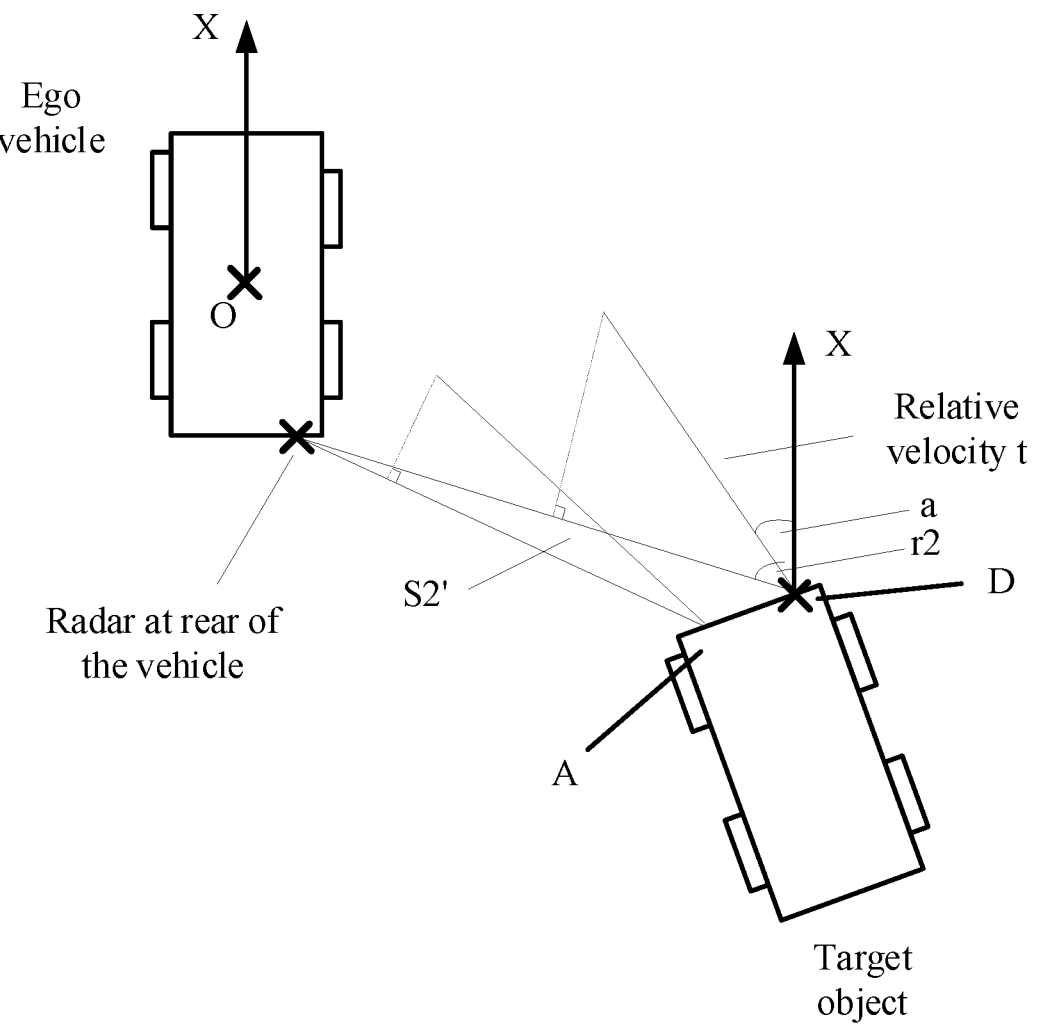

In one embodiment, as shown in FIGS. 7A and 7B, schematic views of the velocity and the direction are illustrated. A vehicle velocity v of the ego vehicle and an angular velocity w of the ego vehicle are obtained by a driving system of the ego vehicle. A distance d between an arrangement position of the sensor and the origin point of the ego vehicle is known, the actual velocity of the sensor can be calculated according to the formula: r=v+wd.

Formula (2) shows the method of calculating the actual velocity t and direction α of the target object, S1 (not shown) is the measured radial velocity of the detection point C (e.g., the detection point C in FIG. 7A), S2 (shown in FIG. 7B) is the measured radial velocity of the detection point D (e.g., the detection point D in FIG. 7A), r1 is the included angle between the actual velocity t of the target object and the line connecting detection point C and the sensor, r2 is the included angle between the actual velocity t of the target object and the line connecting detection point D and the sensor. S1' is the actual velocity of the detection point C, S1' is a sum of the measured radial velocity S1 of the detection point C and the component of the actual velocity r of the sensor in the direction S1. S2' is the actual velocity of the detection point D, S2' is a sum of the measured radial velocity S2 of the detection point D and the component of the actual velocity r of the sensor in the direction S2. α1 is the included angle between the line connecting the detection point C and the sensor and the X-axis, and α2 is the included angle between the line connecting the detection point D and the sensor and the X-axis, α1 and α2 are measured by the sensor.

$$\begin{cases} r = v + wd \\ S1' = S1 + r \cdot \cos(b1) \\ S2' = S2 + r \cdot \cos(b2) \\ t \cdot \cos(r1) = S1' \\ t \cdot \cos(r2) = S2' \\ a1 - r1 = a \\ a2 - r2 = a \end{cases} \quad (2)$$

According to formula (2), the electronic device calculates a plurality of actual velocities of a target object, calculates the average value of the plurality of actual velocities of the target object, obtains the actual velocity of the origin point of the target object, and further calculates a plurality of included angles between the actual velocities of the target object and the X-axis, calculates the average value of the plurality of included angles between the actual velocities of the target object and the X-axis, and obtains the actual movement direction of the origin point of the target object.

At block 108, the electronic device tracks the at least one target object according to the target object data.

In one embodiment, the electronic device tracks the at least one target object according to the target object data by: obtaining a plurality of existing tracking items of the ego vehicle and predicted states of an object tracking algorithm of the plurality of existing tracking items; obtaining a detection state of the at least one detected target object based on the target object data; matching the detection state of the at least one detected target object with the prediction state of the object tracking algorithm of each of the plurality of existing tracking items; if the detection state of the at least one detected target object matches the prediction state of the object tracking algorithm of one of the existing tracking items, updating tracking data of the existing tracking item with the detection state of the matched detected target object, and updating a next prediction state of the object tracking algorithm of the existing tracking item based on the prediction calculation of the object tracking algorithm with the matched detection state of the at least one detected target object; or, if the detection state of the at least one detection target object does not match any prediction states of the object tracking algorithm of the existing tracking items, determining the at least one detected target object as a new tracking item.

In one embodiment, obtaining the existing tracking items of the ego vehicle and the predicted states of the object tracking algorithm of the plurality of existing tracking items includes: obtaining the latest target object detected by the detection data processing module of all sensors, by using object tracking methods including but not limited to Kalman filter, determining the tracked position, relative velocity and direction, and optionally the actual velocity and direction as the tracking state, predicating the state of the existing target object at each timestamp, matching the detection state of the detected target object and predicted states of the existing target objects of new timestamp, and updating the state of the target object, so that the position, the relative velocity and direction, the actual velocity and direction of target object can reduce the deviations caused by measurement errors, and the tracking state can be calculated smoothly.

In one embodiment, matching the detection state of the at least one detection target object around the ego vehicle with the prediction state of the object tracking algorithm of the existing tracking item includes: when tracking the target object, determining the position, the relative velocity, and the direction of the target object as the tracking state, obtaining the latest detection target object detected by the radar in the detection data processing module in each frame, and matching each detection target object with the predicted state of the object tracking algorithm of the existing tracking items. If the detection target object matches the predicted state of the object tracking algorithm of an existing tracking item, the detection target object becomes the new measurement stated of the tracking item, and the tracking state is updated by the object tracking algorithm. If the detection target object does not match the predicted state of the object tracking algorithm of any existing tracking item, a new tracking item is established. If the tracking items in the detection data processing module can still be matched with detection target objects after a certain number of frames, it is determined that the tracking path of the detection target object forms a usable and confident tracking item. On the contrary, if the tracking item does not find a new detection target pair after a certain number of frames, it is determined that the path of the detection target object disappears, and the tracking item of the detection target object is removed from the tracking management item.

Figure 8:
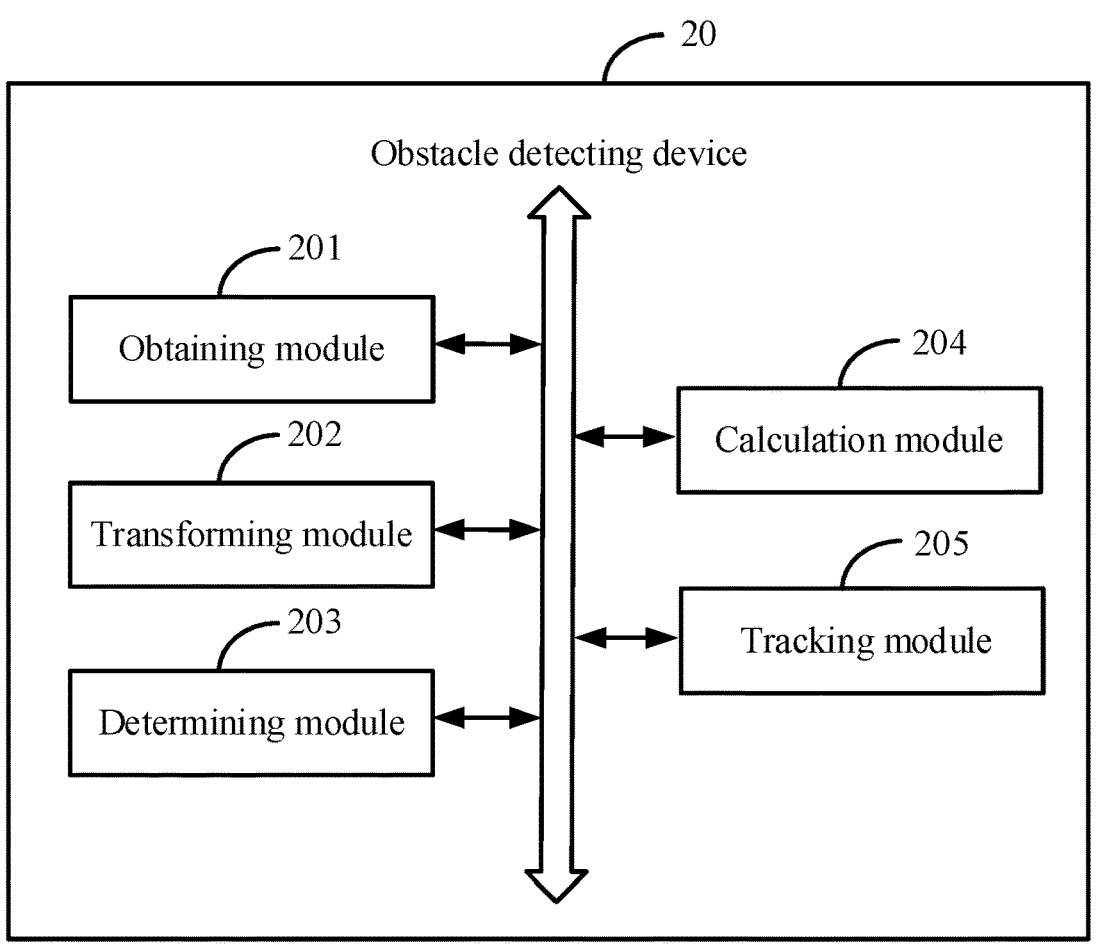
FIG. 8 is a block view of an embodiment of an obstacle detection device according to the present disclosure.

Referring to FIG. 8, an obstacle detecting device 20 is provided. The obstacle detecting device 20 may include a number of functional modules according to the functions performed by the obstacle detecting device 20. The functional modules may include: an obtaining module 201, a transforming module 202, a determining module 203, a calculation module 204, and a tracking module 205. The module referred to in this application refers to a series of computer program segments that can be executed by at least one processor and can perform preset functions, and are stored in a memory. In this embodiment, the function of each module will be described in detail.

The obtaining module 201 obtains detection point data from at least one sensor, the detection point data includes a first position coordinate of each detection point in a plurality of detection points.

The transforming module 202 transforms the first position coordinate of each detection point into second position coordinate of each detection point relative to the ego vehicle.

The determining module 203 determines at least one target object according to the plurality of second position coordinates.

The calculation module 204 calculates target object data of the at least one target object according to the second position coordinate of each detection point relative to the ego vehicle.

The tracking module 205 tracks the at least one target object according to the target object data.

Figure 9:
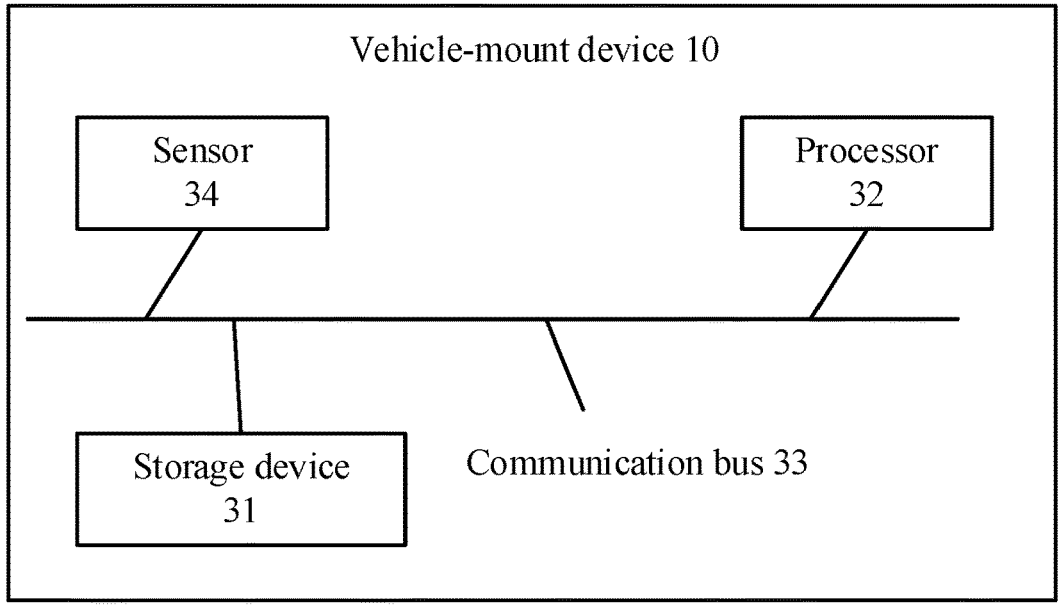
FIG. 9 is a block view of an embodiment of a vehicle-mounted device according to the present disclosure.

FIG. 9 illustrates the vehicle-mounted device 10 in one embodiment. The vehicle-mounted device 10 includes, but is not limited to, a storage device 31, a processor 32, a communication bus 33, and at least one sensor 34. The storage device 31, the processor 32, and the at least one sensor 34 are connected with each other though the communication bus 33. The storage device 31 stores the obstacle detecting device 20 installed in the vehicle-mounted device 10. The computer program of the obstacle detecting device 20 is stored in the storage device, and executed by the processor 32 for implementing the function of detecting obstacles. The computer program can include instructions. FIG. 9 illustrates only one example of the vehicle-mounted device 10. Other examples can include more or fewer components than as illustrated or have a different configuration of the various components in other embodiments.

The at least one sensor 34 may be a mounted device of the vehicle or a radar device externally attached to the vehicle for detecting obstacles around the vehicle, the obstacles may be any object or pedestrian that may obstruct the moving of the vehicle.

The processor 32 can be a central processing unit (CPU), a microprocessor, or other data processor chip that performs functions in the electronic device 1.

In one embodiment, the storage device 31 can include various types of non-transitory computer-readable storage mediums. For example, the storage device 31 can be an internal storage system, such as a flash memory, a random access memory (RAM) for the temporary storage of information, and/or a read-only memory (ROM) for permanent storage of information. The storage device 31 can also be an external storage system, such as a hard disk, a storage card, or a data storage medium.

The storage device 31 stores instructions, the processor 32 executes the computer program stored in the storage device 31 for implementing the method for detecting obstacles provided in the embodiments of the present disclosure. The computer program can include instructions.

Upon execution of the instructions stores in the storage device 31, the processor 32 is configured to: obtain detection point data from at least one sensor, the detection point data includes a first position coordinate of each detection point in a plurality of detection points; transform the first position coordinate of each detection point to a second position coordinate of each detection point relative to the ego vehicle; determine at least one target object according to the plurality of second position coordinates; calculate target object data of the at least one target object according to the second position coordinate of each detection point relative to the ego vehicle; tracks the at least one target object according to the target object data.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
obtain detection point data from at least one sensor, the detection point data comprising a first position coordinate of each of a plurality of detection points;
transform the first position coordinate of each of the plurality of detection points to a second position coordinate of each of the plurality of detection points relative to an ego vehicle;
determine at least one target object according to a plurality of second position coordinates by:
obtaining at least one detection point group by grouping the plurality of detection points by a clustering algorithm, based on the second position coordinate of each of the plurality of detection point relative to the ego vehicle;
determining a bounding box of a target object based on the at least one detection point group;

aligning the bounding box of the target object to a position of each of the at least one detection point group, and obtaining an aligned bounding box corresponding to each of the at least one detection point group;
processing the aligned bounding box corresponding to each of the at least one detection point group, and obtaining at least one processed aligned bounding box; and
determine each of the at least one processed aligned bounding box as the target object;
calculate target object data of the at least one target object according to a second position coordinate of each of the plurality of detection points relative to the ego vehicle; and
track the at least one target object according to the target object data.

2. The electronic device according to claim 1, wherein the at least one processor is further caused to:
determine the bounding box of the target object according to a preset target object model based on the at least one detection point group;
in response that at least two aligned bounding boxes overlap, and the at least two aligned bounding boxes meet a preset overlapping condition, obtain the at least one processed aligned bounding box by combining the at least two aligned bounding boxes.

3. The electronic device according to claim 1, wherein the at least one processor is further caused to:
determine a target object model corresponding to each of the at least one detection point group;
determine the bounding box of the target object according to the target object model;
in response that at least two aligned bounding boxes overlap, and the at least two aligned bounding boxes meet a preset overlapping condition, obtain the at least one processed aligned bounding box by combining the at least two aligned bounding boxes.

4. The electronic device according to claim 3, wherein the at least one processor is further caused to:
set a size of the bounding box of the target object by the target object model.

5. The electronic device according to claim 3, wherein the at least one processor is further caused to:
determine coordinates of a center point of each bounding box as position coordinates of the target object corresponding to each bounding box.

6. The electronic device according to claim 1, wherein the at least one processor is further caused to:
calculate position coordinates and velocity of the at least one target object relative to the ego vehicle according to the second position coordinates of each detection point relative to the ego vehicle, and an included angle between a direction of a velocity of the at least one target object and an X-axis of a coordinate system of the ego vehicle; and
determine the position coordinates and the velocity of the at least one target object relative to the ego vehicle, and the included angle between the direction of the velocity of the at least one target object and the X-axis of the coordinate system of the ego vehicle as the target object data.

7. The electronic device according to claim 6, wherein the at least one processor is further caused to:
obtain a plurality of existing tracking items of the ego vehicle and a predicted state of an object tracking algorithm of each of the plurality of existing tracking items;

obtain a detection state of at least one detected target object based on the target object data;

match the detection state of the at least one detected target object with the prediction state of the object tracking algorithm of each of the plurality of existing tracking items;

in response that the detection state of the at least one detected target object matches the prediction state of the object tracking algorithm of one of the existing tracking items, update tracking data of the existing tracking item with the detection state of the at least one detected target object, and update a next prediction state of the object tracking algorithm of the existing tracking item with the matched detection state of the at least one detected target object;

in response that the detection state of the at least one detection target object does not match any prediction state of the object tracking algorithm of each of the plurality of existing tracking items, determine the at least one detected target object as a new tracking item.

8. A method for detecting obstacles implemented in an electronic device comprising:

obtaining detection point data from at least one sensor, the detection point data comprising a first position coordinate of each of a plurality of detection points;

transforming the first position coordinate of each of the plurality of detection points to a second position coordinate of each of the plurality of detection points relative to an ego vehicle;

determining at least one target object according to a plurality of second position coordinates, comprising:

obtaining at least one detection point group by grouping the plurality of detection points by a clustering algorithm, based on the second position coordinate of each of the plurality of detection point relative to the ego vehicle;

determining a bounding box of a target object based on the at least one detection point group;

aligning the bounding box of the target object to a position of each of the at least one detection point group, and obtaining an aligned bounding box corresponding to each of the at least one detection point group;

processing the aligned bounding box corresponding to each of the at least one detection point group, and obtaining at least one processed aligned bounding box; and determining each of the at least one processed aligned bounding box as the target object;

calculating target object data of the at least one target object according to a second position coordinate of each of the plurality of detection points relative to the ego vehicle; and tracking the at least one target object according to the target object data.

9. The method according to claim 8, wherein determining the bounding box of the target object based on the at least one detection point group comprises:

determining the bounding box of the target object according to a preset target object model based on the at least one detection point group;

wherein processing the aligned bounding box corresponding to each of the at least one detection point group, and obtaining at least one processed aligned bounding box comprises:

in response that at least two aligned bounding boxes overlap, and the at least two aligned bounding boxes meet a preset overlapping condition, obtaining the at least one processed aligned bounding box by combining the at least two aligned bounding boxes.

10. The method according to claim 8, wherein determining the bounding box of the target object based on the at least one detection point group comprises:

determining a target object model corresponding to each of the at least one detection point group;

determining the bounding box of the target object according to the target object model;

wherein processing the aligned bounding box corresponding to each of the at least one detection point group, and obtaining at least one processed aligned bounding box comprises:

in response that at least two aligned bounding boxes overlap, and the at least two aligned bounding boxes meet a preset overlapping condition, obtaining the at least one processed aligned bounding box by combining the at least two aligned bounding boxes.

11. The method according to claim 10, further comprising:

setting a size of the bounding box of the target object by the target object model.

12. The method according to claim 10, further comprising:

determining the coordinates of the center point of each bounding box as the position coordinates of the target object corresponding to each bounding box.

13. The method according to claim 8, further comprising:

calculating position coordinates and velocity of the at least one target object relative to the ego vehicle according to the second position coordinates of each detection point relative to the ego vehicle, and an included angle between a direction of a velocity of the at least one target object and an X-axis of a coordinate system of the ego vehicle; and determining the position coordinates and the velocity of the at least one target object relative to the ego vehicle, and the included angle between the direction of the velocity of the at least one target object and the X-axis of the coordinate system of the ego vehicle as the target object data.

14. The method according to claim 13, wherein tracking the at least one target object according to the target object data comprises:

obtaining a plurality of existing tracking items of the ego vehicle and a predicted state of an object tracking algorithm of each of the plurality of existing tracking items;

obtaining a detection state of at least one detected target object based on the target object data;

matching the detection state of the at least one detected target object with the prediction state of the object tracking algorithm of each of the plurality of existing tracking items;

in response that the detection state of the at least one detected target object matches the prediction state of the object tracking algorithm of one of the existing tracking items, updating tracking data of the existing tracking item with the detection state of the at least one detected target object, and updating a next prediction state of the object tracking algorithm of the existing tracking item with the matched detection state of the at least one detected target object;

in response that the detection state of the at least one detection target object does not match any prediction state of the object tracking algorithm of each of the plurality of existing tracking items, determining the at least one detected target object as a new tracking item.

15. A non-transitory computer-readable storage medium having instructions stored thereon, when the instructions are executed by a processor of an electronic device, the processor is configured to perform a method for detecting obstacles, wherein the method comprises:

obtaining detection point data from at least one sensor, the detection point data comprising a first position coordinate of each of a plurality of detection points;

transforming the first position coordinate of each of the plurality of detection points to a second position coordinate of each of the plurality of detection points relative to an ego vehicle;

determining at least one target object according to a plurality of second position coordinates, comprising:

obtaining at least one detection point group by grouping the plurality of detection points by a clustering algorithm, based on the second position coordinate of each of the plurality of detection point relative to the ego vehicle;

determining a bounding box of a target object based on the at least one detection point group;

aligning the bounding box of the target object to a position of each of the at least one detection point group, and obtaining an aligned bounding box corresponding to each of the at least one detection point group;

processing the aligned bounding box corresponding to each of the at least one detection point group, and obtaining at least one processed aligned bounding box; and determining each of the at least one processed aligned bounding box as the target object;

calculating target object data of the at least one target object according to a second position coordinate of each of the plurality of detection points relative to the ego vehicle; and tracking the at least one target object according to the target object data.

16. The non-transitory computer-readable storage medium according to claim 15, wherein determining the bounding box of the target object based on the at least one detection point group comprises:

determining the bounding box of the target object according to a preset target object model based on the at least one detection point group;

wherein processing the aligned bounding box corresponding to each of the at least one detection point group, and obtaining at least one processed aligned bounding box comprises:

in response that at least two aligned bounding boxes overlap, and the at least two aligned bounding boxes meet a preset overlapping condition, obtaining the at least one processed aligned bounding box by combining the at least two aligned bounding boxes.

17. The non-transitory computer-readable storage medium according to claim 15, wherein determining the bounding box of the target object based on the at least one detection point group comprises:

determining a target object model corresponding to each of the at least one detection point group;

determining the bounding box of the target object according to the target object model;

wherein processing the aligned bounding box corresponding to each of the at least one detection point group, and obtaining at least one processed aligned bounding box comprises:

in response that at least two aligned bounding boxes overlap, and the at least two aligned bounding boxes meet a preset overlapping condition, obtaining the at least one processed aligned bounding box by combining the at least two aligned bounding boxes.

18. The non-transitory computer-readable storage medium according to claim 17, wherein the method further comprises:

setting a size of the bounding box of the target object by the target object model.

19. The non-transitory computer-readable storage medium according to claim 17, wherein the method further comprises:

determining the coordinates of the center point of each bounding box as the position coordinates of the target object corresponding to each bounding box.

20. The non-transitory computer-readable storage medium according to claim 15, wherein the method further comprises:

calculating position coordinates and velocity of the at least one target object relative to the ego vehicle according to the second position coordinates of each detection point relative to the ego vehicle, and an included angle between a direction of a velocity of the at least one target object and an X-axis of a coordinate system of the ego vehicle; and determining the position coordinates and the velocity of the at least one target object relative to the ego vehicle, and the included angle between the direction of the velocity of the at least one target object and the X-axis of the coordinate system of the ego vehicle as the target object data.

\* \* \* \* \*